United States Patent [19]
Takenaka

[11] Patent Number: 6,115,639
[45] Date of Patent: *Sep. 5, 2000

[54] REMOTE CONTROL SYSTEM FOR LEGGED MOVING ROBOT

[75] Inventor: Toru Takenaka, Wako, Japan

[73] Assignee: Honda Giken Kogyo Kabushiki Kaisha, Tokyo, Japan

[*] Notice: This patent is subject to a terminal disclaimer.

[21] Appl. No.: 08/998,235

[22] Filed: Dec. 24, 1997

[30] Foreign Application Priority Data

Dec. 24, 1996 [JP] Japan ..................................... 8-343922

[51] Int. Cl.$^7$ ....................................................... B25J 1/00
[52] U.S. Cl. ............................ 700/85; 700/245; 700/258; 700/264; 414/5; 318/568.12
[58] Field of Search .............................. 700/85, 245, 258, 700/260, 262, 264; 701/49; 180/8.1, 8.2, 8.3, 8.4, 8.5, 8.6, 8.7; 318/568.12, 568.11; 414/5, 4; 901/1; 446/330

[56] References Cited

U.S. PATENT DOCUMENTS

| | | |
|---|---|---|
| 3,535,711 | 10/1970 | Fick ............................................. 414/5 |
| 3,923,166 | 12/1975 | Fletcher et al. .......................... 700/262 |
| 4,046,262 | 9/1977 | Vykukal et al. ............................. 414/5 |
| 4,837,734 | 6/1989 | Ichikawa et al. .......................... 700/85 |
| 5,038,089 | 8/1991 | Szakaky ..................................... 701/23 |
| 5,116,180 | 5/1992 | Fung et al. ................................... 414/5 |
| 5,357,433 | 10/1994 | Takenaka et al. ......................... 701/23 |
| 5,382,885 | 1/1995 | Salcudean et al. ................. 318/568.11 |
| 5,459,659 | 10/1995 | Takenaka ................................. 700/260 |
| 5,841,258 | 11/1998 | Takenaka ........................... 318/568.12 |
| 5,967,580 | 10/1999 | Rosheim ................................... 294/88 |
| 5,980,256 | 11/1999 | Carmein .................................... 434/55 |
| 6,016,385 | 1/2000 | Yee et al. ................................ 700/245 |

FOREIGN PATENT DOCUMENTS

| | | |
|---|---|---|
| 04354684 | 9/1992 | Japan . |
| 5-318340 | of 1993 | Japan . |
| 5-337849 | of 1993 | Japan . |

OTHER PUBLICATIONS

European Search Report.
R.S. Mosher R.A. Liston: "A Versatile Walking Truck", Porc, Transp. Eng. Conf (Ice, London), 1968, pp. 255–268, XP002084162.
English language Abstract of JP 5–318340.
English language Abstract of JP 5–337849.

*Primary Examiner*—William Grant
*Assistant Examiner*—Edward F. Gain, Jr.
*Attorney, Agent, or Firm*—Lyon & Lyon LLP

[57] ABSTRACT

A remote control system for remotely controlling a legged moving robot has a robot manipulator operable by an operator seated on a seat assembly thereof for applying an operation command to the legged moving robot, the seat assembly having a seatback or a seat which is tiltable. A robot control unit on the legged moving robot controls the legged moving robot automatically to achieve a target orientation stably depending on the operation command from the robot manipulator. An orientation detector detects an orientation of the legged moving robot, and a tilting mechanism tilts the seatback or the seat depending on a deviation of the orientation of the legged moving robot detected by the orientation detector from the target orientation.

11 Claims, 12 Drawing Sheets

STABLE ORIENTATION

TARGET ORIENTATION OF UPPER BODY

UNSTABLE ORIENTATION

UPPER BODY ORIENTATION DEVIATION

TARGET ORIENTATION OF UPPER BODY

ACTUAL UPPER BODY ORIENTATION

ROBOT UPPER BODY ORIENTATION COMMAND

SEAT TILT ANGLE

ROBOT UPPER BODY ORIENTATION COMMAND

SEAT TILT ANGLE

REMOTE CONTROL SYSTEM FOR LEGGED MOVING ROBOT

BACKGROUND OF THE INVENTION

1. Field of the Invention

The present invention relates to a remote control system for remotely controlling a legged moving robot.

2. Description of the Prior Art

There has generally been known a remote control system for remotely controlling legged moving robots such as biped (two-legged) walking robots or the like. The known remote control system includes a robot manipulator having a joystick that is operated by the operator sitting on a seat to give a desired operation command for walking, stopping, bending, or holding an article to the robot for thereby remotely controlling the robot. Based on the supplied operation command, the robot establishes its own target orientation and controls its actual orientation until the target orientation is achieved. Furthermore, the robot has a fail-safe function to automatically stabilize its orientation in order to prevent itself from being excessively tilted and turning over due to a control error made by the operator.

The fail-safe function basically allows the robot to maintain its own orientation stably regardless of control errors made by the operator. However, there are still situations where the robot tends to become unstable in orientation and is inclined to turn over under unexpected external forces applied to the robot as when the robot is controlled trolled to carry a heavy object or the robot accidentally hits some object.

It has been desirable for the conventional remote control system to cause the operator to recognize appropriately a situation w here the robot is unstable under unexpected external forces and also to allow the operator to take some action quickly to correct the orientation of the robot.

There has also been known a remote control system which includes a master unit as a robot manipulator that is worn by the operator and operated to transmit an operator's action to the robot, serving as a slave unit, which also transmits its own action back to the master unit, so that the operator's action and the robot's action will be equalized on the basis of so-called bilateral master-slave principles. Since the bilateral master-slave remote control system basically equalizes the operator's action and the robot's action to each other, the robot itself does not have a function to automatically stabilize its own orientation. While the bilateral master-slave remote control system allows the operator to recognize a change in the orientation of the robot, and even if the orientation change will make the robot unstable, the operator may fail to recognize such robot orientation instability if the operator finds himself stable regardless of the orientation change.

SUMMARY OF THE INVENTION

It is therefore an object of the present invention to provide a remote control system for remotely controlling a legged moving robot which operates under operation commands from a robot manipulator operated by the operator while stabilizing its own orientation, the remote control system being capable of allowing the operator to recognize, accurately and reliably, a condition in which the orientation of the robot becomes unstable under unexpected external forces applied to the robot.

To achieve the above object, there is provided in accordance with the present invention a remote control system for remotely controlling a legged moving robot, comprising a robot manipulator operable by an operator seated on a seat assembly thereof for applying an operation command to the legged moving robot, the seat assembly having a seatback or a seat which is tiltable, control means on the legged moving robot, for controlling the legged moving robot automatically to achieve a target orientation stably depending on the operation command from the robot manipulator, orientation detecting means for detecting an orientation of the legged moving robot, and tilting means for tilting the seatback or the seat depending on a deviation of the orientation of the legged moving robot detected by the orientation detecting means from the target orientation.

While the operator seated on the seat assembly is remotely controlling the legged moving robot with the robot manipulator, if the legged moving robot is subjected to an unexpected external force, and the orientation of the robot detected by the orientation detecting means deviates from the target orientation of the robot, then the seatback or the seat is tilted by the tilting means. The tiling movement of the seatback or the seat causes the operator to immediately feel and recognize the unstable orientation of the robot, and the operator can operate the robot manipulator in order to eliminate unstable orientation of the robot.

Therefore, the operator is able to reliably recognize a condition in which the orientation of the robot becomes unstable under an unexpected external forces or the like applied to the robot.

The tilting means tilts the seatback or the seat by a distance depending on the magnitude of the deviation of the detected orientation from the target orientation. Inasmuch as the degree of the unstable orientation of the robot is transmitted as the amount of tilt of the seatback or the seat to the operator, the operator can recognize the degree of the unstable orientation of the robot highly accurately. The seat may be tiltable to move a front end thereof vertically, and the tilting means may tilt the seat in a direction to lower the front end thereof when the deviation of the detected orientation from the target orientation lies in a direction which the legged moving robot is tilted forward, and tilt the seat in a direction to lift the front end thereof when the deviation of the detected orientation from the target orientation lies in a direction which the legged moving robot is tilted backward. The seat may be tiltable leftward and rightward, and the tilting means may tilt the seat rightward when the deviation of the detected orientation from the target orientation lies in a direction which the legged moving robot is tilted rightward, and tilt the seat leftward when the deviation of the detected orientation from the target orientation lies in a direction which the legged moving robot is tilted leftward. The seat may be tiltable to move a front end thereof vertically and also tiltable leftward and rightward, and the tilting means may tilt the seat in a direction to lower the front end thereof when the deviation of the detected orientation from the target orientation lies in a direction which the legged moving robot is tilted forward, tilt the seat in a direction to lift the front end thereof when the deviation of the detected orientation from the target orientation lies in a direction which the legged moving robot is tilted backward, tilt the seat rightward when the deviation of the detected orientation from the target orientation lies in a direction which the legged moving robot is tilted rightward, and tilt the seat leftward when the deviation of the detected orientation from the target orientation lies in a direction which the legged moving robot is tilted leftward.

The seatback may be tiltable forward and backward, and the tilting means may tilt the seatback forward when the deviation of the detected orientation from the target orientation lies in a direction which the legged moving robot is tilted forward, and tilt the seatback backward when the deviation of the detected orientation from the target orientation lies in a direction which the legged moving robot is tilted backward. The seatback may be tiltable leftward and rightward, and the tilting means may tilt the seatback rightward when the deviation of the detected orientation from the target orientation lies in a direction which the legged moving robot is tilted rightward, and tilt the seatback leftward when the deviation of the detected orientation from the target orientation lies in a direction which the legged moving robot is tilted leftward. The seatback may be tiltable forward, backward, leftward, and rightward, and the tilting means may tilt the seatback forward when the deviation of the detected orientation from the target orientation lies in a direction which the legged moving robot is tilted forward, tilt the seatback backward when the deviation of the detected orientation from the target orientation lies in a direction which the legged moving robot is tilted backward, tilt the seatback rightward when the deviation of the detected orientation from the target orientation lies in a direction which the legged moving robot is tilted rightward, and tilt the seatback leftward when the deviation of the detected orientation from the target orientation lies in a direction which the legged moving robot is tilted leftward.

Because the seat or the seatback or both may be tiltable in the direction of the deviation of the detected orientation from the target orientation, the operator may be able to recognize the direction in which the orientation of the robot is unstable.

The seatback may be tiltable in unison with an upper body of the operator, and the robot manipulator may have means for applying a tilting movement of the seatback as an operation command to tilt an upper body of the legged moving robot to the legged moving robot.

The orientation of the robot is tilted according to the tilting movement of the upper body of the operator. If the orientation of the robot becomes unstable in the direction in which it is tilted, then the seat is tilted in that direction. Therefore, the operator can effectively recognize unstableness of the robot in a manner to be closely associated with the movement of the robot.

If a tilting movement of the seatback is applied as an operation command to tilt an upper body of the legged moving robot to the robot, then it is preferable for the remote control system to have tilting limiting means for limiting a tilting movement of the seatback caused by an orientation change of the upper body of the operator when the seat is tilted. When the seat is tilted, the upper body orientation of the operator may change against the intention of the operator. If the seatback is tilted in unison with the upper body of the operator, then the upper body of the robot is tilted in a manner not intended by the operator. This problem can be solved by the tilting limiting means which limits a tilting movement of the seatback caused by an orientation change of the upper body of the operator when the seat is tilted.

The tilting limiting means may comprise means for correcting an amount of tilt of the seatback depending on a force applied from the operator to seat or an amount of tilt of the seat when the seat is tilted.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
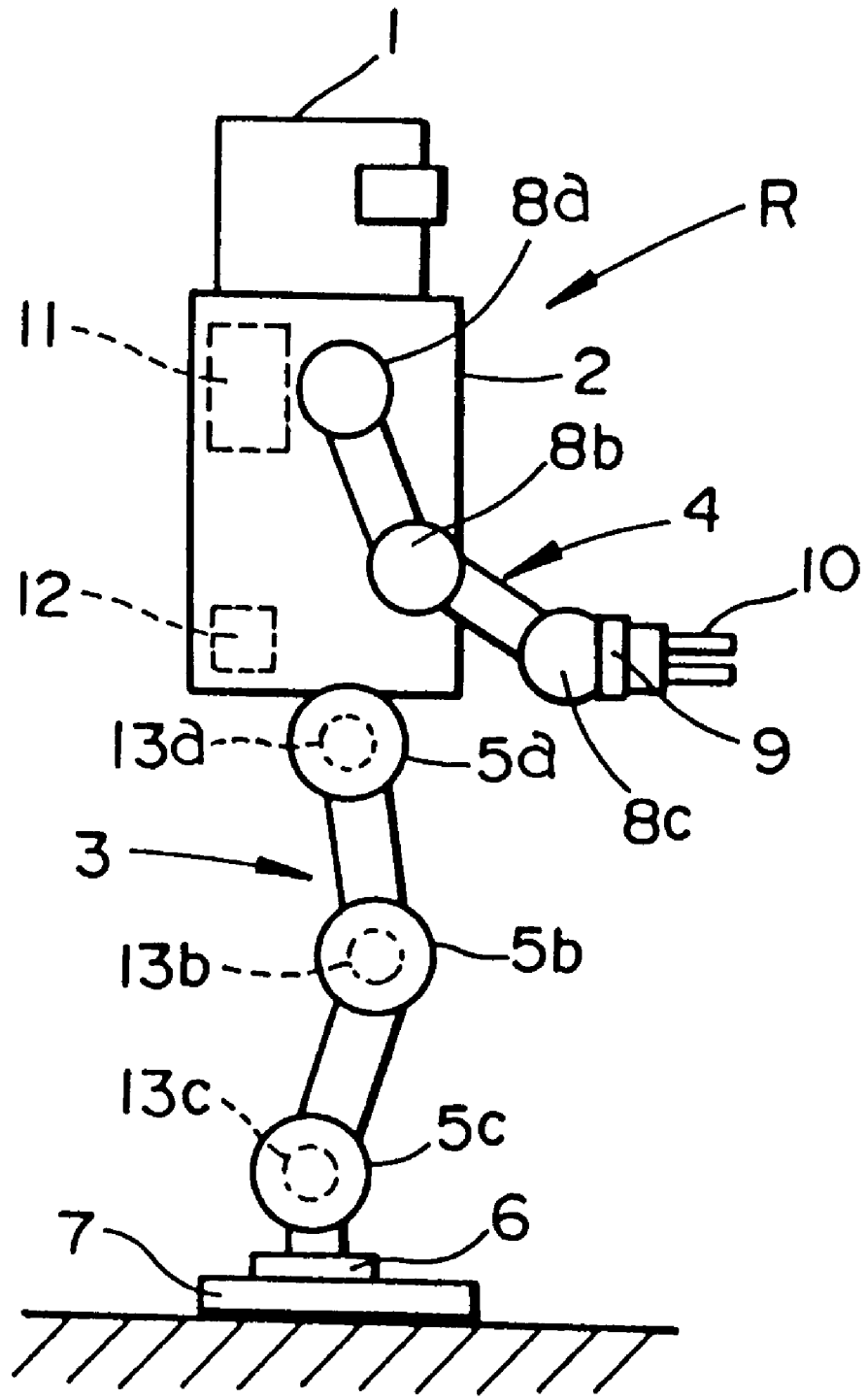
FIG. 1 is a schematic side elevational view of a legged moving robot controlled by a remote control system according to a first embodiment of the present invention.

Like or corresponding parts are denoted by like or corresponding reference characters throughout the views.

Figure 2:
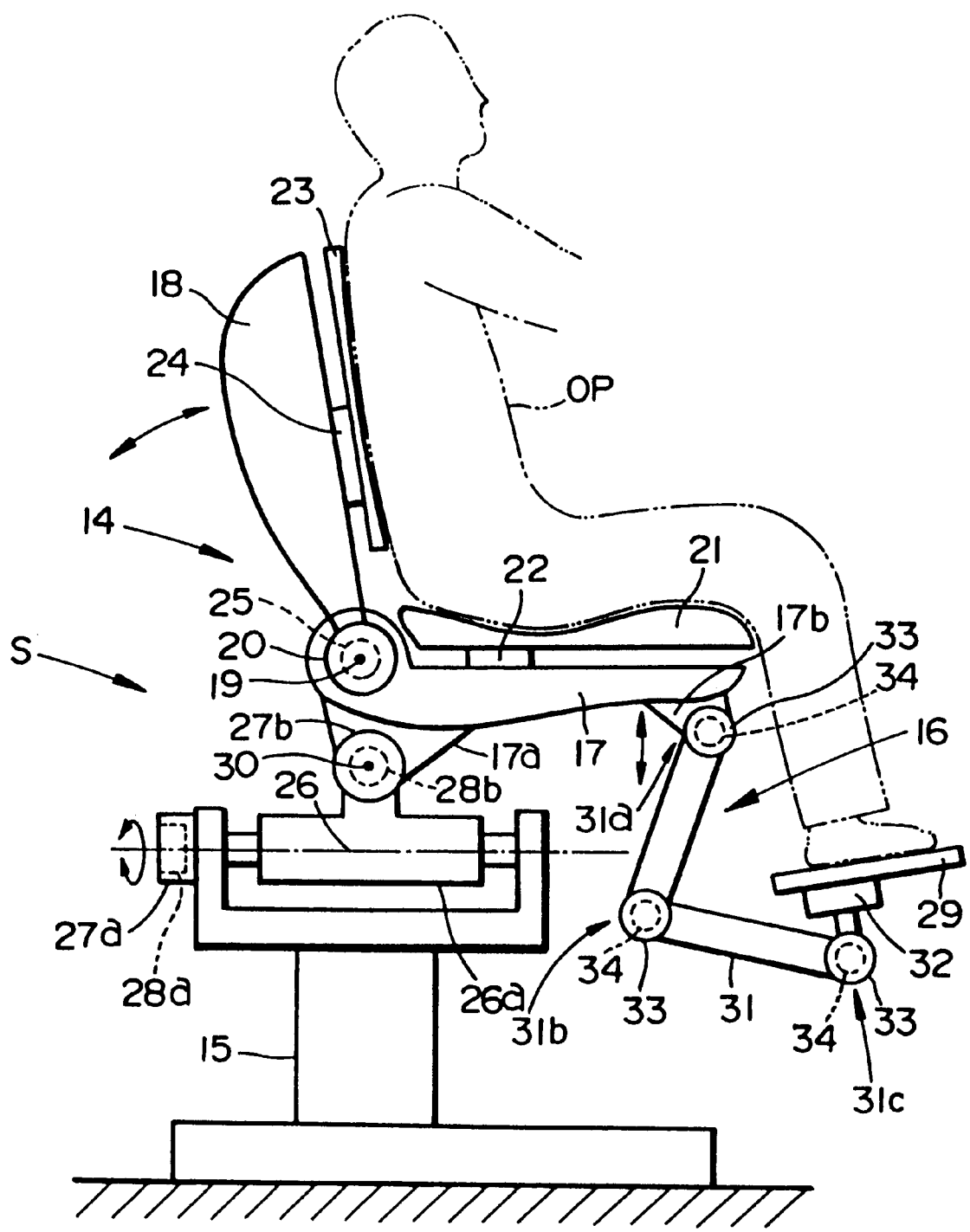
FIG. 2 is a schematic side elevational view of a robot manipulator of the remote control system according to the first embodiment of the present invention.

FIGS. 1 and 2 show, respectively, a legged moving robot controlled by a remote control system according to a first embodiment of the present invention, and a robot manipulator of the remote control system according to the first embodiment of the present invention.

As shown in FIG. 1, the legged moving robot, generally denoted by R, comprises a biped (two-legged) walking robot having a torso 2 supporting a head 1 on its upper end, a pair of legs 3 (only one shown) extending downwardly from a lower end of the torso 2, and a pair of arms 4 (only one shown) extending from respective upper lateral sides of the torso 2.

Each of the legs 3 has a hip joint actuator 5a at a hip joint between the torso 2 and the leg 3, a knee joint actuator 5b at a knee joint, and an ankle joint actuator 5c at an ankle joint. A foot 7 for contacting a floor is operatively connected through a six-axis force sensor 6 to a lower end of the ankle joint actuator 5c. The hip joint actuator 5a serves to rotate the leg 3 about three axes, i.e., a sagittal axis, a lateral axis, and a vertical axis. The knee joint actuator 5b serves to rotate the leg 3 about the lateral axis. The ankle joint actuator 5c serves to rotate the foot 7 about the sagittal axis and the lateral axis. The hip, knee, and ankle joint actuators 5a, 5b, 5c are activated to move the leg 3 in a manner similar to the legs of human beings. The six-axis force sensor 6 serves to detect forces acting on the foot 7, i.e., force components applied to the robot R along the sagittal, lateral, and vertical axes, and moments generated about these axes.

Each of the arms 4 has a shoulder joint actuator 8a at a shoulder joint between the torso 2 and the arm 4, an elbow joint actuator 8b at an elbow joint, and a wrist joint actuator 8c at a wrist joint. A hand 10 is operatively connected through a six-axis force sensor 9 to the wrist joint actuator 8c. The shoulder joint actuator 8a serves to rotate the arm 4 about the sagittal axis, the lateral axis, and the vertical axis. The elbow joint actuator 8b serves to rotate the arm 4 about the lateral axis. The wrist joint actuator 8c serves to rotate the hand 10 about the sagittal axis, the lateral axis, and the vertical axis.

The torso 2 houses therein a robot control unit 11 for activating and controlling the actuators 5a~5c, 8a~8c, and a tilt detector (orientation detecting means) 12 for detecting a tilted state of the robot R which is indicative of an upper body orientation of the robot R. The robot control unit 11 and the tilt detector 12 will be described in detail later on. The actuators 5a~5c are associated respectively with actuator displacement detectors 13a~13c for detecting angular displacements of the respective actuators 5a~5c about the appropriate axes. Similarly, the actuators 8a~8c are associated respectively with actuator displacement detectors (not shown) for detecting angular displacements of the respective actuators 8a~8c about the appropriate axes. The actuators 5a~5c that are associated with the legs 3 will hereinafter also be referred to collectively as leg actuators 5, and the corresponding actuator displacement detectors 13a~13c as actuator displacement detectors 13.

As shown in FIG. 2, the robot manipulator, generally denoted by S, comprises a seat assembly 14 for an operator OP, indicated by the imaginary lines, to be seated thereon, and a base 15 supporting the seat assembly 14 thereon. The robot manipulator S also has a pair of master legs 16 (only one shown) to be associated with the respective legs of the operator OP for operating the legs 3 of the robot R in a master-slave fashion. The robot manipulator S also has a pair of master arms (not shown) to be associated with the respective arms of the operator OP for operating the arms 4 of the robot R in a master-slave fashion.

The seat assembly 14 comprises a substantially horizontal seat base 17 and an upstanding seatback base 18 extending upwardly from a rear end of the seat base 17. The seatback base 18 is tiltably mounted on the rear end of the seat base 17 for angular movement about lateral axis 19 of the seat assembly 14 in forward and backward directions (in a sagittal plane of the operator OP) by a seatback actuator 20 positioned at the lateral axis 19. A seat 21 for the operator OP to be seated thereon is mounted on an upper surface of the seat base 17 with a seat load sensor 22 interposed between the seat 21 and the seat base 17. A seatback 23 for bearing the back of the operator OP is mounted on a front surface of the seatback base 18 with a seatback load sensor 24 interposed between the seatback 23 and the seatback base 18. The load sensors 22, 24 serve to detect loads that are applied to the seat 21 and the seatback 23 by the operator OP who is seated on the seat assembly 14.

The torso of the operator OP seated on the seat assembly 14 is fastened to the seat assembly 14 by a belt or the like (not shown) for movement in unison with the seatback 23. The seatback actuator 20 is combined with an actuator displacement detector 25 for detecting an angular displacement of the seatback actuator 20, i.e., a tilt angle of the seatback 23. The seat load sensor 22, which will be used in a remote control system according to a second embodiment of the present invention, as described later on, may be dispensed with and the seat 21 may be integral with the seat base 17 in the first embodiment of the present invention.

A shaft 26a which is angularly movable about a sagittal axis 26 of the seat 14 by a first seat actuator 27a is mounted on an upper end of the base 15. A bracket 17a fixed to and extending downwardly from a rear lower surface of the seat base 17 is pivotally mounted on the shaft 26a for angular movement about a lateral axis 30 of the seat assembly 14 by a second seat actuator 27b. When the first seat actuator 27a is operated, the seat 21 is tilted laterally about the axis 26. When the second seat actuator 27b is operated, the seat 21 is tilted about the axis 30 to move a front end of the seat 21 vertically.

The seat actuators 27a, 27b are associated with respective actuator displacement detectors 28a, 28b for detecting angular displacements of the respective seat actuators 27a, 27b, i.e., tilt angles in lateral and vertical directions of the seat 21. The seat actuators 27a, 27b will hereinafter also be referred to collectively as seat actuators 27, and the corresponding actuator displacement detectors 28a, 28b as actuator displacement detectors 28.

Each of the master legs 16 comprises a foot support 29 for supporting thereon a foot of the operator OP who is seated on the seat 21, and a movable leg 31 in the form of a linkage by which the foot support 29 is operatively coupled to a bracket 17b fixed to a front lower surface of the seat base 17. The foot support 29 is mounted on a distal end of the movable leg 31 with a six-axis force sensor 32 interposed therebetween.

The foot of the operator OP placed on the foot support 29 is fastened thereto by a belt or the like (not shown). The six-axis force sensor 32 serves to detect forces applied from the foot of the operator OP to the foot support 29, i.e., force components applied to the foot support 29 along the sagittal, lateral, and vertical axes, and moments generated about these axes.

The movable leg 31 has a joint 31a disposed on its proximal end coupled to the bracket 17b, a joint 31b disposed on an intermediate portion thereof, and a joint 31c disposed on the distal end thereof. The joints 31a, 31b, 31c are associated with respective master leg actuators 33 for actuating these joints 31a, 31b, 31c. The master leg actuator 33 associated with the joint 31a serves to rotate the master leg 16 about the sagittal axis, the lateral axis, and the vertical axis. The master leg actuator 33 associated with the joint 31b serves to rotate the master leg 16 about the lateral axis. The master leg actuator 33 associated with the joint 31c serves to rotate the master leg 16 about the sagittal axis and the lateral axis. When the foot of the operator OP moves, these master leg actuators 33 are operated to move the foot support 29 in unison with the foot of the operator OP with six degrees of freedom. The master leg actuators 33 are associated with respective actuator displacement detectors 34 for detecting respective displacements of the master leg actuators 33.

Figure 3:
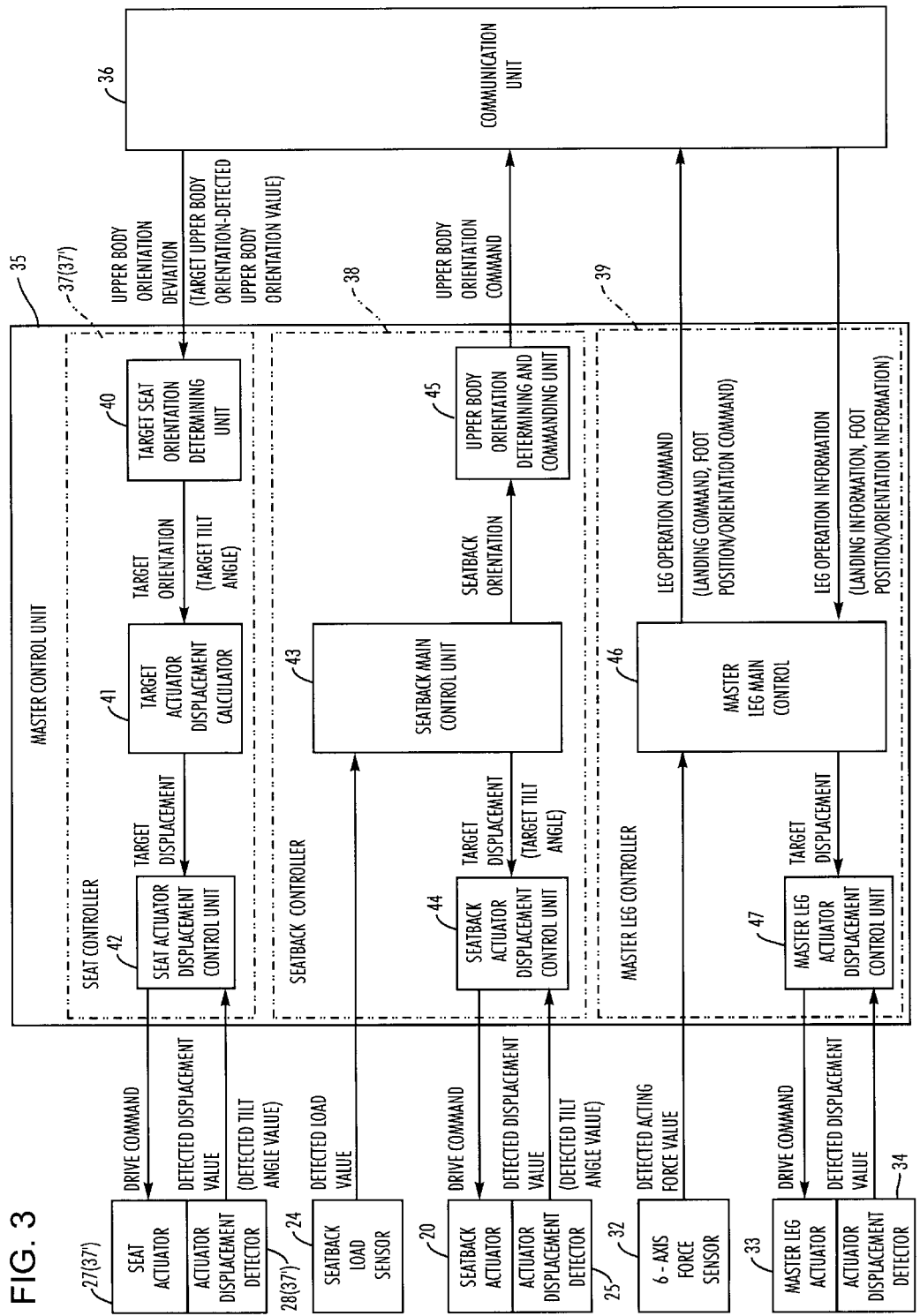
FIG. 3 is a block diagram of a control system section for the robot manipulator shown in FIG. 2.
Figure 4:
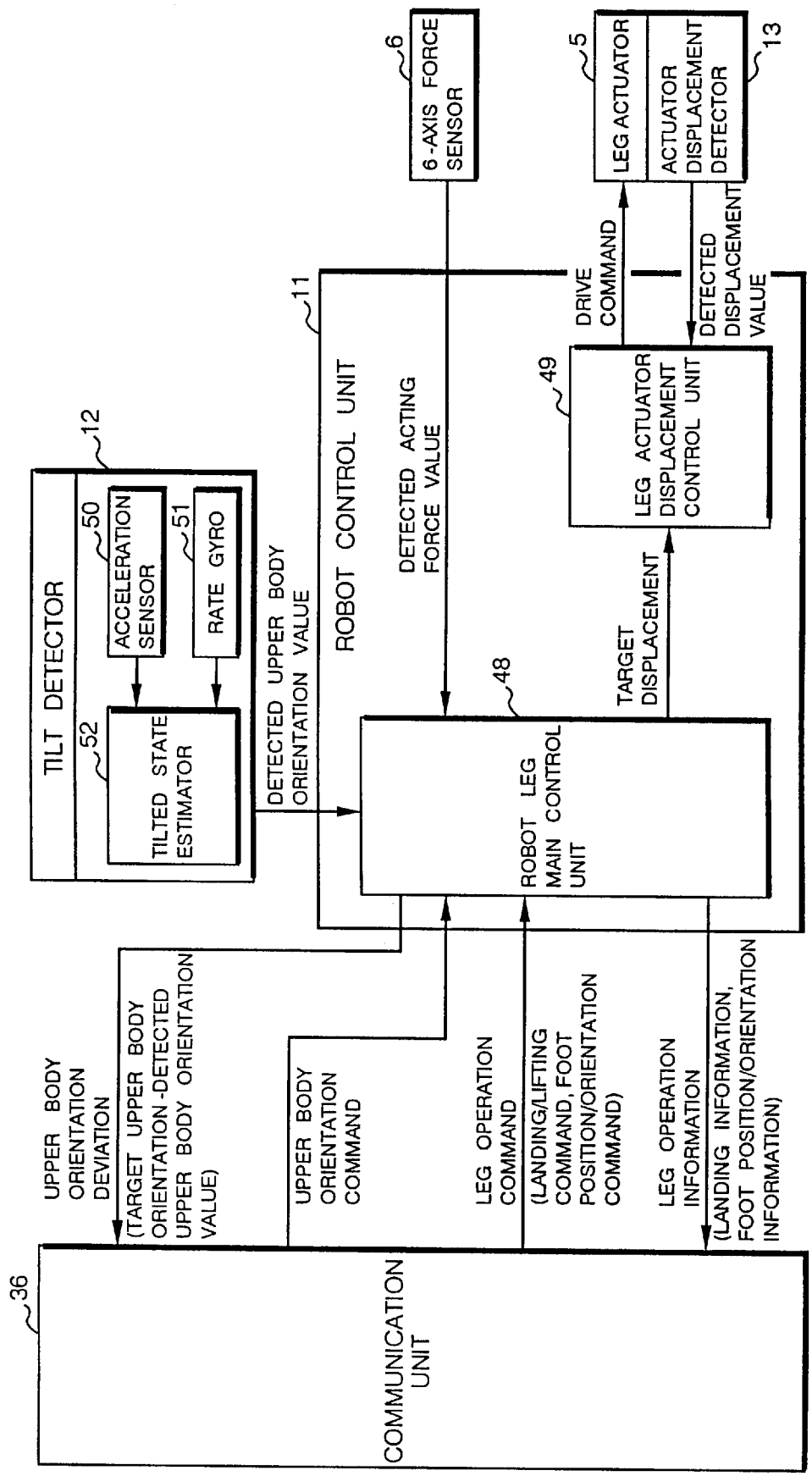
FIG. 4 is a block diagram of a control system section for the legged moving robot shown in FIG. 1.

The remote control system for remotely controlling the legged moving robot R according to the first embodiment of the present invention includes control system sections shown in FIGS. 3 and 4 for controlling operation of the robot manipulator S and the robot R.

The remote control system includes a master control unit 35 (see FIG. 3) disposed in the robot manipulator S, a robot control unit 11 (see FIG. 4) disposed in the robot R, and a communication unit 36 for effecting communications between the master control unit 35 and the robot control unit 11. The communication unit 36 may be a wired or wireless communication unit.

As shown in FIG. 3, the master control unit 35 comprises a seat controller 37 for controlling tilting of the seat 21, a seatback controller 38 for controlling tilting of the seatback 23, and a master leg controller 39 for controlling operation of the master leg 16. The master control unit 35 also has master arm controllers for controlling operation of the master arms (not shown). These controllers will not be shown and described below.

The seat controller 37 comprises a target seat orientation determining unit 40 for determining a target orientation (tilt angles in the vertical and lateral directions) of the seat 21 based on data (described later on) supplied from the robot control unit 11 through the communication unit 36, a target actuator displacement calculator 41 for calculating target displacements of the seat actuators 27, and a seat actuator displacement control unit 42 for controlling the seat actuators 27 to be displaced by the calculated target displacements through a feedback control loop based on the calculated target displacements and displacement values of the seat actuators 27 detected by the actuator displacement detectors 28.

The seat controller 37, the seat actuators 27, and the actuator displacement detectors 28 jointly serve as a tilting means 37'.

The seatback controller 38 comprises a seatback main control unit 43 for determining a target displacement of the seatback actuator 20 (a target tilt angle of the seatback 23) based on a load value detected by the seatback load sensor 24, i.e., a load (a moment about the axis 19) applied from the back of the operator OP seated on the seat assembly 14 to the seatback 23, a seatback actuator displacement control unit 44 for controlling the seatback actuator 20 to be displaced by the determined target displacement corresponding to the target tilt angle through a feedback control loop based on the determined target displacement and a displacement value of the seatback actuator 20 detected by the actuator displacement detector 25 (a detected displacement angle of the seatback 23), and an upper body orientation determining and commanding unit 45 for determining an upper body orientation of the robot R from an orientation of the seatback 23 that is determined from the target displacement of the seatback actuator 20 which has been determined by the seatback main control unit 43 and sending a command representative of the determined upper body orientation of the robot R through the communication unit 36 to the robot control unit 11.

The master leg controller 39 comprises a master leg main control unit 46 for determining target displacements of the master leg actuators 33 based on detected values from the six-axis force sensor 32 of the master leg 16, i.e., forces applied to the foot support 29 from an action of the foot of the operator OP, and operation information of the legs 3 of the robot R which is transmitted from the robot control unit 11 through the communication unit 36 (landing information of the legs 3 and position/orientation information of the feet 7 of the legs 3 with respect to the torso 2), and a master leg actuator displacement control unit 47 for controlling the master leg actuators 33 to be displaced by the determined target displacements through a feedback control loop based on the determined target displacements and displacement values of the master leg actuators 33 detected by the actuator displacement detectors 34.

Depending on the operation of the foot support 29 by the operator OP, the master leg main control unit 46 gives a leg operation command such as a landing/lifting command for the foot 7 of each leg 3 of the robot R and a position/orientation command for the foot 7 when landed, to robot control unit 11.

As shown in FIG. 4, the robot control unit 11 comprises a robot leg main control unit 48 for determining target displacements of the leg actuators 5 of each of the legs 3 while stabilizing the orientation of the robot R, based on an upper body orientation command supplied from the upper body orientation determining and commanding unit 45, a leg operation command supplied from the master leg main control unit 46, a tilted state of the upper body (the torso 2) of the robot R which has been detected by the tilt detector 12 on the robot R, and forces acting on the foot 7 which have been detected by the six-axis force sensor 6 of each leg 3, and a leg actuator displacement control unit 49 for controlling the leg actuators 5 to be displaced by the determined target displacements through a feedback control loop based on the determined target displacements and displacement values of the leg actuators 5 detected by the actuator displacement detectors 13.

The robot leg main control unit 48 transmits a deviation or error (upper body orientation deviation) between an upper body target orientation (a target tilted state) in a target gait (described later on) of the robot R which is generated on the basis of an upper body orientation command supplied from the upper body orientation determining and commanding unit 45 through the communication unit 36, and a tilted state of the upper body of the robot R which has been detected by the tilt detector 12 (a detected upper body orientation value), as data indicative of a deviation of the upper body orientation of the robot R from the target orientation, through the communication unit 36 to the target seat orientation determining unit 40. The robot leg main control unit 48 also transmits landing information of each leg 3 (information representative of whether the foot 7 of each leg 3 has landed on a floor or the like) and position/orientation information of the foot 7 of each leg 3 with respect to the torso 2, as leg operation information of the robot R through the communication unit 36 to the master leg main control unit 46.

The tilt detector 12 comprises an acceleration sensor 50 for detecting an acceleration of the upper body of the robot R, a rate gyro 51 for detecting a yaw rate of the upper body of the robot R, and a tilted state estimator 52 for calculating and estimating a tilted state of the upper body of the robot R (a tilt angle of the torso 2) from detected values from the acceleration sensor 50 and the rate gyro 51. The tilt detector 12 supplies a tilted state of the upper body of the robot R which has been estimated by the tilted state estimator 52 as a detected upper body orientation value to the robot leg main control unit 48.

The robot control unit 11 also has a control arrangement for controlling the arms 4 of the robot R. However, such a control arrangement will not be shown and described below.

Operation of the remote control system according to the first embodiment of the present invention will be described below.

First, basic operation of the robot manipulator S as it is operated by the operator OP and resultant basic operation of the robot R will be described below.

If the operator OP seated on the seat assembly 14 is to control the robot R to walk, the operator OP moves his own feet placed on and fastened to the foot supports 29 in a walking pattern according to which the operator OP wants the robot R to walk. Specifically, the operator OP lifts the foot to be moved, and lowers the foot to a position in and with an orientation with which the operator OP wants the robot R to land on a floor or the like. The operator OP repeats such an action with respect to each of the legs.

Figure 5:
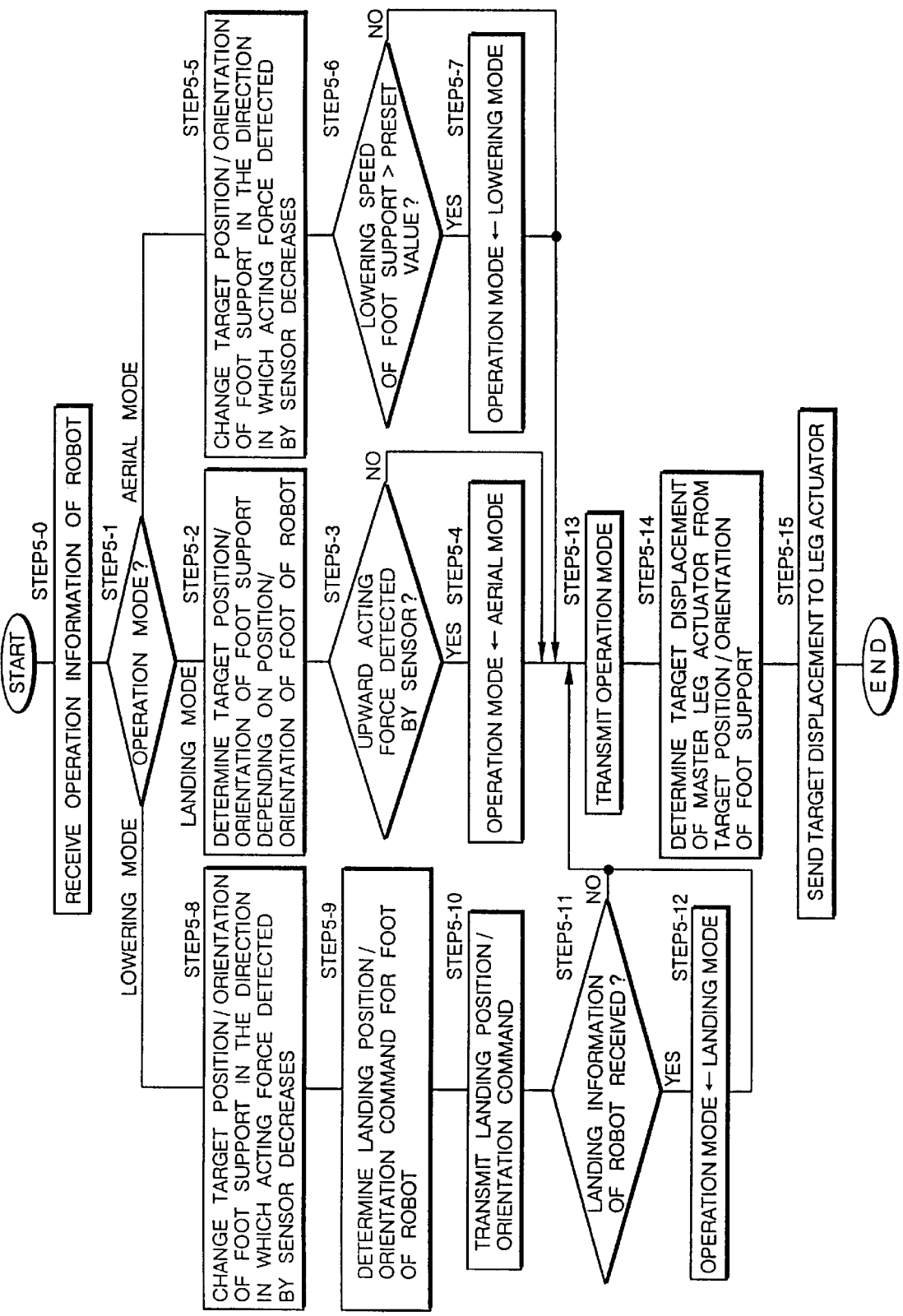
FIG. 5 is a flowchart of an operation sequence of the control system section shown in FIG. 3.

At this time, the master leg main control unit 46 carries out an operation sequence shown in FIG. 5 in predetermined control cycles for each of the master legs 16.

As shown in FIG. 5, the master leg main control unit 46 receives operation information of the robot R such as leg operation information (landing information, foot position/ orientation information) from the robot control unit 11 through the communication unit 36 in STEP5-0, and then determines an operation mode of each of the master legs 16 in STEP5-1. Operation modes of each of the master legs 16 include a landing mode, an aerial mode, and a lowering mode. The landing mode is a mode corresponding to the operation of a supporting leg (a landing leg) while the robot R is walking. The aerial mode is a mode corresponding to the lifting operation of a swinging leg (a lifted leg) while the robot R is walking. The lowering mode is a mode corresponding to the operation of the swinging leg which is about to be landed. The initial operation of the robot R when the robot R starts to be manipulated is the landing mode.

If the operation mode is the landing mode in STEP5-1, then the master leg main control unit 46 determines a target position/orientation of the foot support 29 depending on the present position/orientation information of the foot 7 of each leg 3 with respect to the torso 2 (specifically, the thigh of the torso 2) of the robot R, which information is supplied from the robot leg main control unit 48 through the communication unit 36, in STEP5-2. The master leg main control unit 46 thereafter ascertains whether or not an upward acting force is detected by the six-axis force sensor 32 in STEP5-3. If an upward acting force is detected, i.e., if the operator OP lifts the foot, then the master leg main control unit 46 changes the operation mode to the aerial mode in STEP5-4, after which control proceeds to STEP5-13. If no upward acting force is detected, then control jumps from STEP5-3 to STEP5-13.

If the operation mode is the aerial mode in STEP5-1, then the master leg main control unit 46 changes the present target position/orientation of the foot support 29 in the direction in which the acting force detected by the six-axis force sensor 32 decreases, thus determining a new target position/orientation in STEP5-5. Then, the master leg main control unit 46 decides whether a lowering speed of the target position/orientation of the foot support 29 exceeds a preset value or not in STEP5-6. If the lowering speed is greater than the preset value, then the master leg main control unit 46 changes the operation mode to the lowering mode in STEP5-7, after which control proceeds to STEP5-13. If the lowering speed is smaller than or equal to the preset value in STEP5-6, then control jumps from STEP5-6 to STEP5-13.

If the operation mode is the lowering mode in STEP5-1, then the master leg main control unit 46 changes the present target position/orientation of the foot support 29 in the direction in which the downward force detected by the six-axis force sensor 32 decreases, thus determining a new target position/orientation in STEP5-8. Then, the master leg main control unit 46 determines a position/orientation command for the foot 7 corresponding to the foot support 29 in the lowering mode to be landed, based on a relative positional relationship between the target position/orientation of the foot support 29 in the present lowering mode and the other foot support 29 (the foot support 29 in the landing mode) in STEP5-9. The master leg main control unit 46 transmits the determined position/orientation command through the communication unit 36 to the robot leg main control unit 48 in STEP5-10. The master leg main control unit 46 then ascertains whether it has received information indicating that the leg 3 of the robot R corresponding to the foot support 29 in the lowering mode is landed, from the robot leg main control unit 48, in STEP5-11. If the master leg main control unit 46 has received the landing information, then the master leg main control unit 46 changes the operation mode to the landing mode in STEP5-12, after which control proceeds to STEP5-13. If the master leg main control unit 46 has not received the landing information, then control jumps from STEP5-11 to STEP5-13.

In STEP5-13, the master leg main control unit 46 transmits the present operation mode as a landing/lifting command for the foot 7 through the communication unit 36 to the robot leg main control unit 48. Thereafter, the master leg main control unit 46 determines target displacements of the master leg actuators 33 corresponding to the present target position/orientation of the foot supports 29 in STEP5-14. Then, the master leg main control unit 46 sends the determined target displacements to the master leg actuator displacement control unit 47 in STEP5-15, whereupon the present control cycle is finished.

When supplied with the determined target displacements from the master leg main control unit 46, the master leg actuator displacement control unit 47 controls the master leg actuators 33 according to the given target displacements through a feedback control loop.

The above control process carried out by the master control unit 35 controls the foot support 29 for the supporting leg into a position/orientation corresponding to the relative position/orientation of the foot 7 with respect to the upper body (thigh position) of the robot R, and also controls the foot support 29 for the swinging leg to move depending on the movement of the foot of the operator OP.

The operation modes of the foot support 29 further includes, in addition to the above three operation modes, a lock mode in which a manipulation start switch (not shown) is turned off. In the lock mode, the foot supports 29 are locked against movement.

If the operator OP seated on the seat assembly 14 is to tilt the upper body of the robot R forward and backward, then the operator OP tilts forward and backward the upper body thereof which is held against the seatback 23 at a desired tilt angle (a tilt angle of the upper body with respect to the seat 21).

Figure 6:
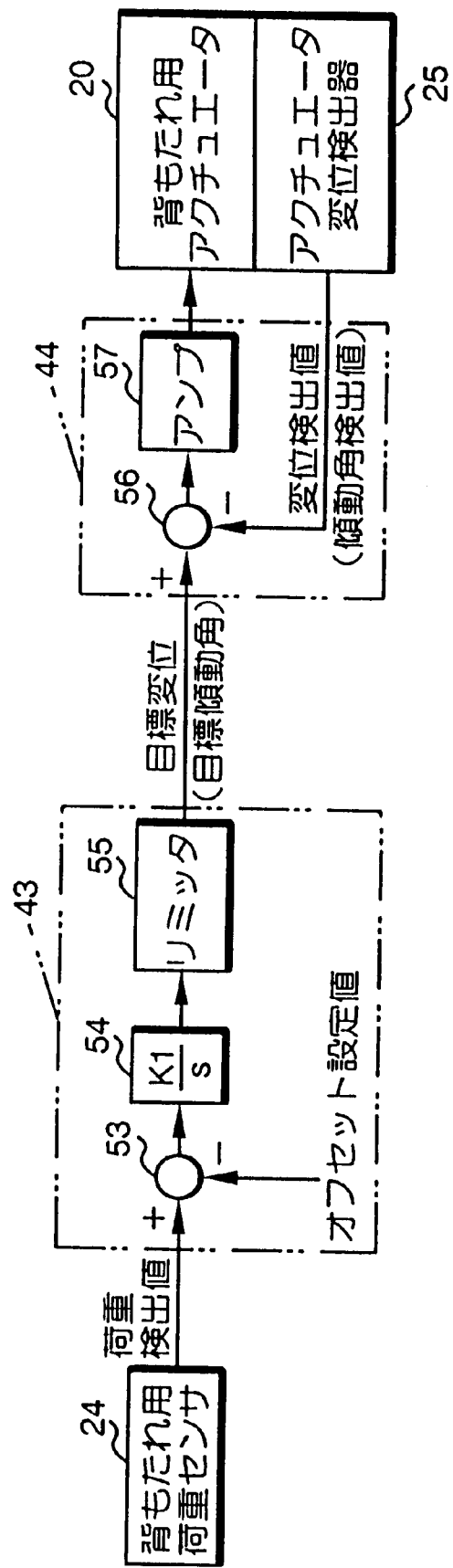
FIG. 6 is a block diagram showing the manner in which the control system section shown in FIG. 3 operates.

At this time, the seatback controller 38 of the master control unit 35 carries out a control process shown in FIG. 6.

As shown in FIG. 6, in the seatback main control unit 43, a subtractor 53 calculates the difference between a detected value from the seatback load sensor 24, i.e., a load applied to the seatback 23 by the operator OP (a moment generated about the axis 19), and a preset offset value. The preset offset value is a value for counterbalancing the load applied to the seatback 23 by the operator OP while under a state of equilibrium with the upper body of the robot R being not tilted.

Then, an integrator 54 having a given gain K1 in the seatback main control unit 43 integrates an output signal from the subtractor 53 ("s" in the integrator 54 represents a Laplace operator). An integrated output signal from the integrator 54 is passed through a limiter 55 which limits upper and lower limits of the integrated output signal for thereby determining a target displacement of the seatback actuator 20 which is indicative of a target tilt angle of the seatback 23. The determined target displacement is outputted from the seatback main control unit 43 to the seatback actuator displacement control unit 44.

In the seatback actuator displacement control unit 44, a subtractor 56 calculates the difference between the supplied target displacement and a displacement value of the seatback actuator 20 detected by the actuator displacement detector 25 (a detected tilt angle value of the seatback 23), and an amplifier 57 amplifies the calculated difference with a predetermined gain. The amplified difference is supplied from the seatback actuator displacement control unit 44 as a drive command to the seatback actuator 20 for thereby controlling the seatback actuator 20 to be displaced by the target displacement through a feedback control loop.

The above control process carried out by the seatback controller 38 causes the seatback 23 to be tilted forward and backward depending on the orientation tilt of the upper body of the operator OP in forward and backward directions.

In the seatback controller 38, the upper body orientation determining and commanding unit 45 determines the orientation of the upper body of the robot R from the target tilt angle of the seatback 23 (the target displacement of the seatback actuator 20) which has been determined as described above. The upper body orientation determining and commanding unit 45 then transmits the determined orientation through the communication unit 36 to the robot control unit 11.

Figure 7:
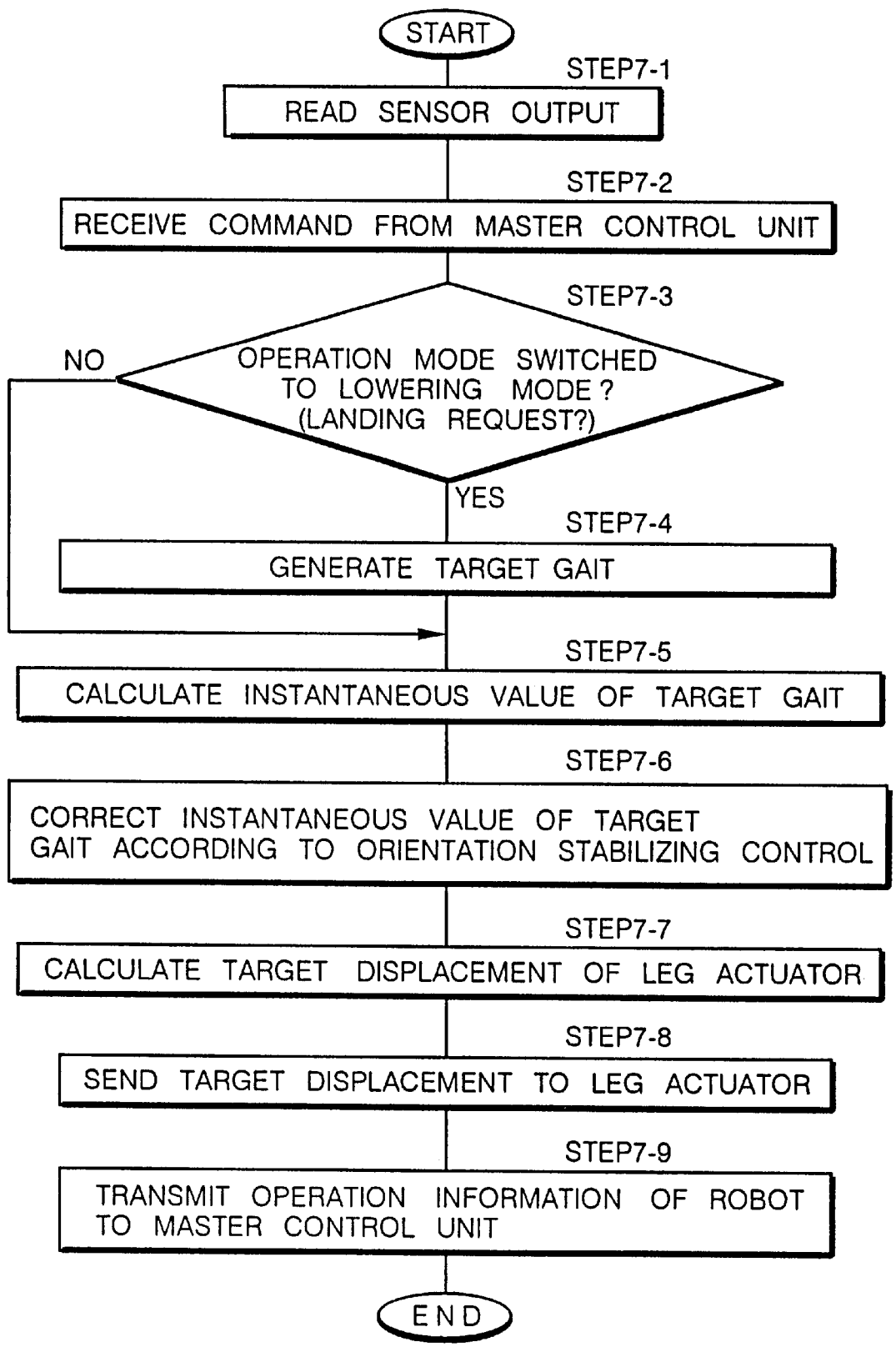
FIG. 7 is a flowchart block diagram showing the manner in which the control system section shown in FIG. 4 operates.

When the robot manipulator S operates as described above, the robot leg main control unit 48 on the robot R carries out an operation sequence shown in FIG. 7 in predetermined control cycles.

As shown in FIG. 7, the robot leg main control unit 48 reads output signals from various sensors including the tilt detector 12 and the six-axis force sensor 6 in STEP7-1, and then receives a leg operation command (a landing/lifting command (an operation mode of the foot support 29 of each master leg 16) and a foot position/orientation command for the foot 7 when landed) and an upper body orientation command supplied through the communication unit 36 from the master control unit 35 in STEP7-2.

Then, the robot leg main control unit 48 decides whether the operation mode of the foot support 29 of either one of the master legs 16 has switched from the aerial mode to the lowering mode (whether there is a landing request or not) in STEP7-3. If the operation mode has switched from the aerial mode to the lowering mode, then the robot leg main control unit 48 generates a basic target gait which defines a leg moving pattern of the legs 3 of the robot R and an orientation of the upper body of the robot R, according to the foot position/orientation command when landed and the upper body orientation command in STEP7-4. The target gait comprises parameters including a target orientation of the upper body of the robot R (a target tilt angle of the upper body), a target foot position/orientation command when the swinging leg 3 is landed, and a target trajectory of the center of a reactive force which is applied from the floor to the foot 7 of the supporting leg 3 when the robot R is walking. The robot leg main control unit 48 generates these parameters for one stride of the leg 3. The target trajectory of the center of the reactive force which is applied from the floor to the foot 7 is generated so as to lie within the landing surface of the foot 7, or a polygon having a minimum area (generally referred to as a "support polygon") which includes the landing surfaces of both the feet 7.

The generation of such a target gait is disclosed in Japanese laid-open patent publication No. 5-318340 (corresponding to U.S. Pat. No. 5,375,433), the disclosure of which is incorporated herein by reference and will not be described below.

Then, the robot leg main control unit 48 calculates an instantaneous value of the target gait in the present control cycle from the basic target gait thus generated in STEP7-5. Thereafter, in order to prevent the robot R from having an unstable orientation tending to turn the robot R over, the robot leg main control unit 48 effects a control process for stabilizing the orientation of the robot R to correct the calculated instantaneous value of the target gait in STEP7-6.

In the control process for stabilizing the orientation of the robot R, the robot leg main control unit 48 corrects the target foot position/orientation in the basic target gait depending on the detected value from the sixaxis force sensor 6 so that the foot 7 will absorb reactive forces which the foot 7 receives from unexpected surface irregularities and inclinations of the floor according to so-called compliance control. Furthermore, the robot leg main control unit 48 corrects the target foot position/orientation depending on the deviation or difference between the target orientation of the upper body of the robot R in the basic gait and the detected value from the tilt detector 12 so that the reactive force from the floor will act on the foot 7 in a direction to restore the upper body orientation of the robot R. In addition, the robot leg main control unit 48 corrects the target orientation of the upper body of the robot R depending on the deviation or difference between the target orientation of the upper body of the robot R and the detected value from the tilt detector 12 so that an inertial force will be generated on the upper body of the robot R in a direction to restore the upper body orientation of the robot R.

The above control process for stabilizing the orientation of the robot R is disclosed in Japanese laid-open patent publication No. 5-337849 (corresponding to U.S. Pat. No. 5,459,659), the disclosure of which is incorporated herein by reference and will not be described below.

Then, the robot leg main control unit 48 calculates a target displacement of each of the leg actuators 5 of each leg 3 in the present control cycle from the corrected instantaneous value of the target gait in STEP7-7, and sends the calculated target displacement as a command to the leg actuator displacement control unit 49 in STEP7-8. At this time, the leg actuator displacement control unit 49 controls each of the leg actuators 5 to be displaced by the calculated target displacement according to the supplied command through a feedback control loop.

Thereafter, the robot leg main control unit 48 transmits leg operation information indicative of the present foot position/orientation of the leg 3 of the robot R (the relative position/orientation of the foot 7 with respect to the torso 2 of the robot R), and the deviation between the present target orientation of the upper body of the robot R and the upper body orientation value detected by the tilt detector 12 (upper body orientation deviation), through the communication unit 36 to the master control unit 35 in STEP7-9, whereupon the present control cycle is finished.

The above operation of the robot R enables the robot R to automatically stabilize its own orientation while the robot R is operated under upper body orientation commands and walking commands from the robot manipulator S operated by the operator OP.

Based on the above basic operation to manipulate the robot R, tilting operation of the seat 21 of the robot manipulator S will be described below.

The orientation of the robot R is basically stabilized by the above control process for stabilizing the orientation of the robot R. When the robot R is subjected to an unexpected external force by an object hitting the robot R or a heavy object carried by the robot R, the orientation of the robot R may be disturbed and become unstable.

When the orientation of the robot R becomes unstable, the upper body orientation detected by the tilt detector 12 deviates from the stable target orientation of the upper body of the robot R (target tilt angle of the upper body) which has been determined according to the above control process, and the produced deviation (upper body orientation deviation) is sent from the robot leg main control unit 48 through the communication unit 36 to the seat controller 37 of the master control unit 35.

In the seat controller 37, the target seat orientation determining unit 40 determines a target orientation of the seat 21, i.e., a target tilt angle of the seat 21, according to the following equation (1):

target tilt angle=tilt feedback ratio·upper body orientation deviation+preset offset value . . . (1)

The tilt feedback ratio is a predetermined gain value which defines an amount of tilt of the seat 21 with respect to the upper body orientation deviation of the robot R. The preset offset value is a predetermined value which defines a tilted position of the seat 21 when the upper body orientation deviation of the robot R is "0", i.e., when the orientation of the robot R is stable.

In this embodiment, the upper body orientation deviation of the robot R is a vector quantity having both a magnitude and a direction. A target tilt angle of the seat 21 due to a component of the upper body orientation deviation of the robot R in a direction in which the upper body of the robot R is tilted forward is a target tilt angle in a direction in which the front end of the seat 21 is lowered about the axis 30. A target tilt angle of the seat 21 due to a component of the upper body orientation deviation of the robot R in a direction in which the upper body of the robot R is tilted backward is a target tilt angle in a direction in which the front end of the seat 21 is lifted about the axis 30. A target tilt angle of the seat 21 due to a component of the upper body orientation deviation of the robot R in a direction in which the upper body of the robot R is tilted to the right as viewed forward of the robot R is a target tilt angle in a direction in which the seat 21 is tilted to the right about the axis 26 (the right end of the seat 21 is lowered). A target tilt angle of the seat 21 due to a component of the upper body orientation deviation of the robot R in a direction in which the upper body of the robot R is tilted to the left as viewed forward of the robot R is a target tilt angle in a direction in which the seat 21 is tilted to the left about the axis 26 (the left end of the seat 21 is lowered).

Then, the target actuator displacement calculator 41 calculates target displacements of the seat actuators 27 depending on the target tilt angle (target orientation) of the seat 21 which has been thus determined, and gives the calculated target displacements to the seat actuator displacement control unit 42. The seat actuator displacement control unit 42 controls the seat actuators 27 to be displaced by the supplied target displacements through a feedback control loop.

Figure 8A:
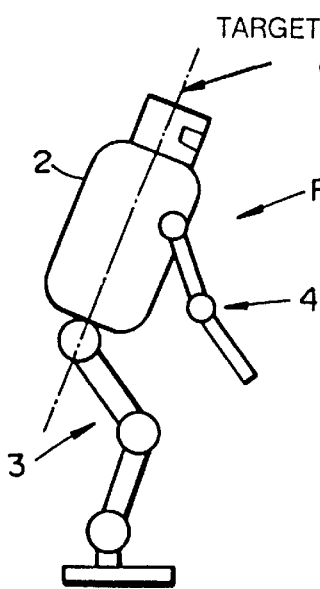
FIGS. 8A and 8B are schematic views showing the relationship between a seat assembly of the robot manipulator and the legged moving robot in a stable condition according to the first embodiment of the present invention.
Figure 8C:
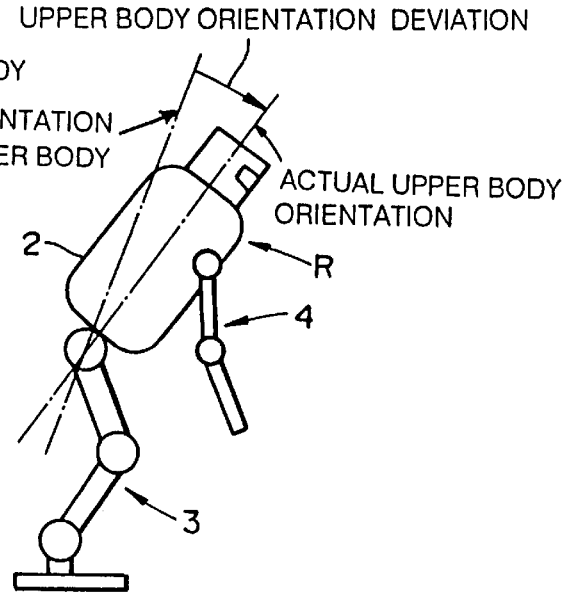
FIGS. 8C and 8D are schematic views showing the relationship between the seat assembly of the robot manipulator and the legged moving robot in an unable condition according to the first embodiment of the present invention.
Figure 8B:
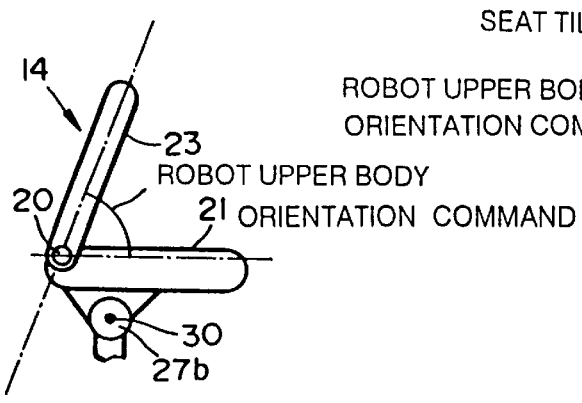
Figure 8D:
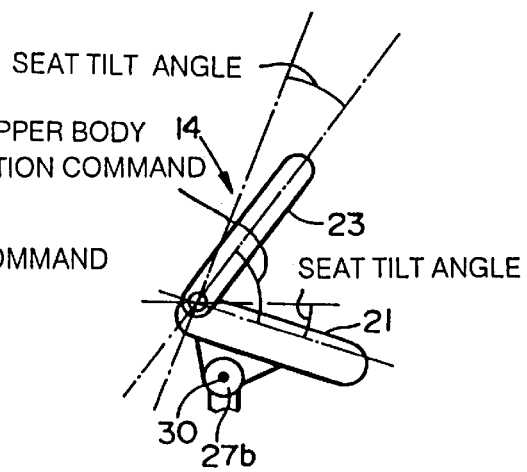

According to the above control process, while the operator OP is tilting the seatback 23 forward as shown in FIG. 8B in order to tilt the robot R forward and the upper body of the robot R is being accordingly tilted forward stably as shown in FIG. 8A, if the robot R is further tilted forward from the stable target orientation under an unexpected external force, resulting in an upper body orientation deviation, as shown in FIG. 8C, then the seat 21 is tilted by the seat actuator 27b to lower its front end by a distance depending on the upper body orientation deviation, as shown in FIG. 8D. At this time, as the seat 21 is tilted, the seatback 23 is also tilted forward from the present tilted position by a distance which is the same as the distance by which the seat 21 is tilted.

Therefore, the upper body of the operator OP seated on the seat assembly 14 is tilted forward by the forward tilting of the seat 21, and the tilted condition of the upper body of the operator OP is further stressed by the further tilting movement of the seatback 23. The operator OP can thus reliably recognize that the orientation of the upper body of the robot R is unstable in the forward tilted direction. Based on that recognition, the operator OP can correct the tilting of the seatback 23 backward or issue a command to move the foot one step forward for thereby eliminating the unstable orientation of the robot R.

Similarly, if the upper body of the robot R is tilted backward from the stable target orientation under an unexpected external force, resulting in an upper body orientation deviation, then the seat 21 is tilted to lift its front end by a distance depending on the upper body orientation deviation, and the seatback 23 is also tilted backward. The operator OP can thus reliably recognize that the orientation of the upper body of the robot R is unstable in the backward tilted direction, and can take an action to eliminate the unstable orientation of the robot R.

Likewise, if the upper body of the robot R is tilted to the left or right from the stable target orientation under an unexpected external force, resulting in an upper body orientation deviation, then the seat 21 and the seatback 23 are also tilted to the left or right in the direction in which the upper body of the robot R has been tilted. The operator OP can thus reliably recognize that the orientation of the upper body of the robot R is unstable in the leftward or rightward tilted direction, and can take an action to eliminate the unstable orientation of the robot R as by issuing a command to move the foot one step in the direction in which the upper body of the robot R has been tilted.

With the remote control system according to the first embodiment of the present invention, therefore, when the orientation of the upper body of the robot R becomes unstable forward, backward, leftward, or rightward under an unexpected external force, the seat 21 and the seatback 23 of the robot manipulator S are also tilted in the direction in which the upper body of the robot R has been tilted. Since both the seat 21 and the seatback 23 are tilted, the operator OP seated on the seat assembly 14 is able to recognize the unstable orientation of the robot R reliably and accurately, and hence can manipulate the robot R accurately to eliminate the unstable orientation thereof.

A remote control system according to a second embodiment of the present invention will be described below with reference to FIG. 9. The remote control system according to the second embodiment differs from the remote control system according to the first embodiment only with respect to a process of controlling the seatback 23 of the robot manipulator S. Those parts shown in FIG. 9 which are identical to those of the remote control system according to the first embodiment are denoted by identical reference characters, and will not be described in detail below.

Figure 9:
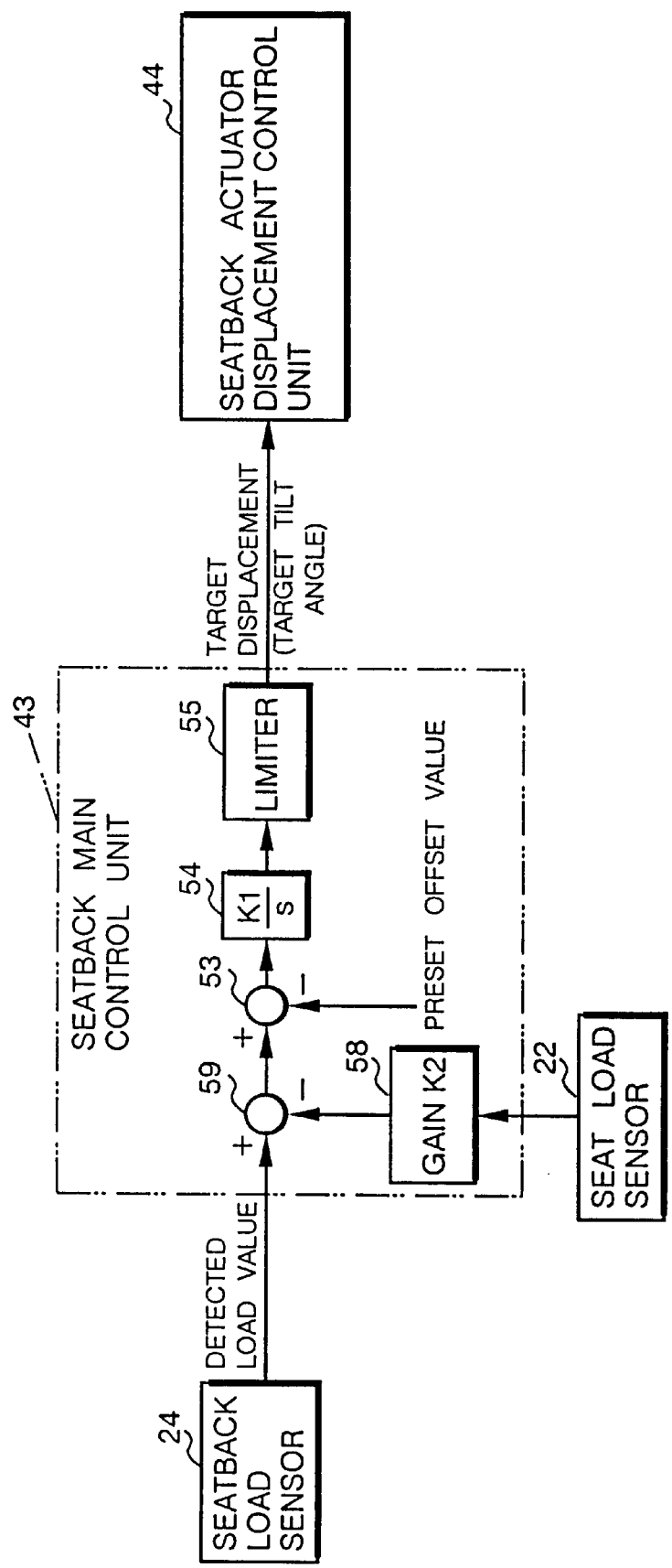
FIG. 9 is a block diagram showing the manner in which a control system section for a robot manipulator of a remote control system according to a second embodiment of the present invention operates.

According to the second embodiment, the seatback main control unit 43 of the seatback controller 38 in the master control unit 35 effects a control process as shown in FIG. 9.

In the seatback main control unit 43, a subtractor 59 calculates the difference between a detected value from the seatback load sensor 24, i.e., a load applied to the seatback 23 by the operator OP (a moment generated about the axis 19), and the product of a load on the seat 21 detected by the seat load sensor 22 (see FIG. 2) (a moment acting on the seat 21) and a predetermined corrective gain value K2, and the calculated difference and the preset offset value are supplied to a subtractor 53 which is the same as the subtractor 53 shown in FIG. 6. The subsequent sequence of the control process shown in FIG. 9 is the same as the control process shown in FIG. 6.

The control process shown in FIG. 9 offers the following advantages: Since the seat 21 is tilted depending on the upper body orientation deviation of the robot R, when the seat 21 is tilted in a direction to lower its front end, the force with which the operator OP pushes the seatback 23 tends to decrease. According to the first embodiment, the tilt angle of the seatback 23 may change even though the operator OP does not intend to change the angle of the seatback 23 (the relative angle of the seatback 23 with respect to the seat 21). In the control process according to the second embodiment, when the seat 21 is tilted in a direction to lower its front end and the load on the seat 21 detected by the seat load sensor 22 decreases, a change in the calculated value from the subtractor 59 is reduced even if the detected value from the seatback load sensor 24 is reduced. By supplying the calculated value from the subtractor 59 and the preset offset value to the subtractor 53, and then carrying out the same control process as described above with respect to the first embodiment, any tilting movement of the seatback 23 in a manner not intended by the operator OP is minimized.

The above advantages are also offered when the seat 21 is tilted in a direction to lift its front end.

According to the second embodiment, the detected value from the seatback load sensor 24 is employed to compensate for a change in the load that is applied to the seatback 23 when the seat 21 is tilted. However, the target tilt angle (target orientation) of the seat 21 or the displacement value of the seat actuator 27b detected by the actuator displacement detector 28b (the actual tilt angle of the seat 21) may instead be used to compensate for such a change in the load.

A remote control system according to a third embodiment of the present invention will be described below with reference to FIG. 10. The remote control system according to the third embodiment differs from the remote control system according to the first embodiment only with respect to a process of controlling the seatback 23 of the robot manipulator S. Those parts shown in FIG. 10 which are identical to those of the remote control system according to the first embodiment are denoted by identical reference characters, and will not be described in detail below.

According to the second embodiment of the present invention, the robot R has a moment sensor (not shown) for detecting a moment which acts on the thigh of the robot R, i.e., a junction between the torso 2 and the legs 3 when the upper body of the robot R is tilted as the seatback 23 of the robot manipulator S is tilted by the operator OP. The robot leg main control unit 48 of the robot control unit 11 calculates a moment that is applied about the thigh of the robot R by the upper body of the robot R under its own weight and inertial force, through dynamic calculations from the target gait determined as described above and the upper body orientation detected by the tilt detector 12, and subtracts the calculated moment from the moment detected by the moment sensor, thereby determining a moment about the thigh under an external force. The robot leg main control unit 48 then supplies the determined moment about the thigh under the external force through the communication unit 36 to the seatback main control unit 43 in the master control unit 35.

Figure 10:
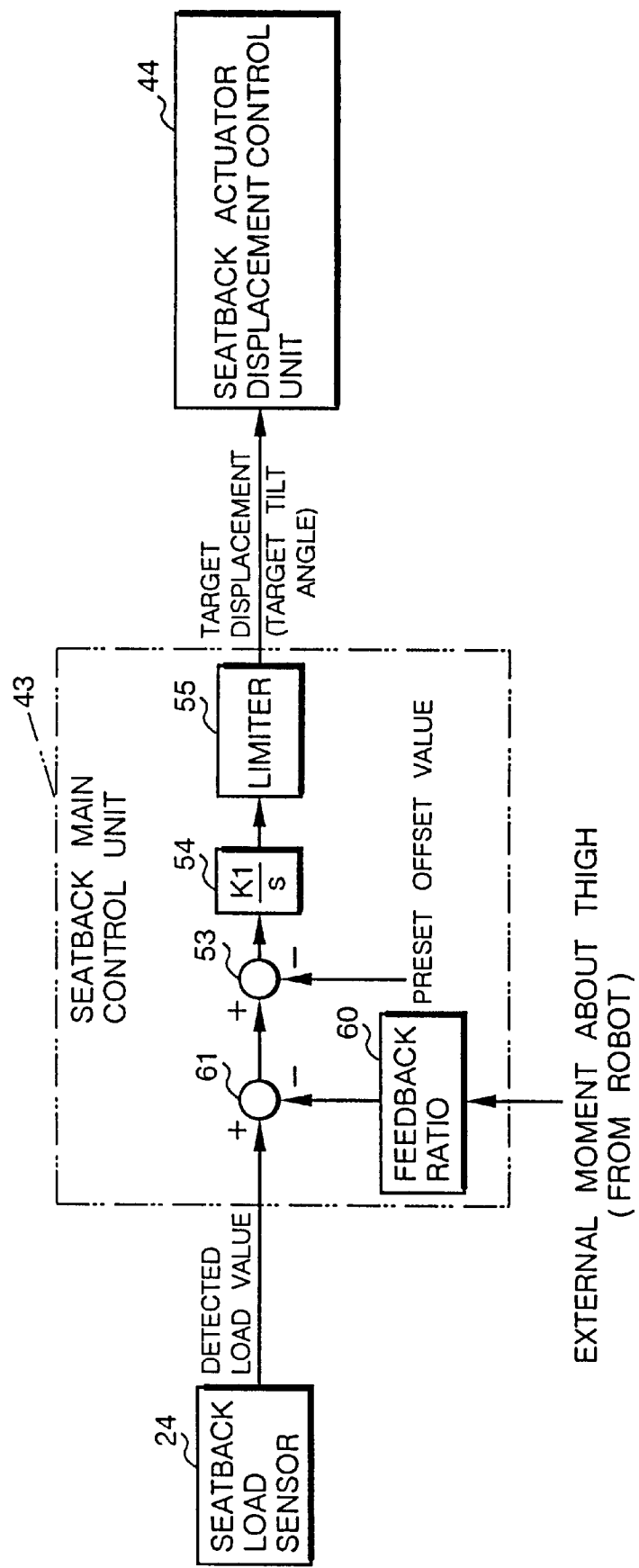
FIG. 10 is a block diagram showing the manner in which a control system section for a robot manipulator of a remote control system according to a third embodiment of the present invention operates.

The seatback main control unit 43 then effects a control process as shown in FIG. 10.

In the seatback main control unit 43, a subtractor 61 calculates the difference between a detected value from the seatback load sensor 24 and the product of the supplied moment about the thigh under the external force and a predetermined feedback ratio (gain), and the calculated difference and the preset offset value are supplied to a subtractor 53 which is the same as the subtractor 53 shown in FIG. 6. The subsequent sequence of the control process shown in FIG. 10 is the same as the control process shown in FIG. 6.

The control process shown in FIG. 10 offers the following advantages: When the operator OP tilts the seatback 23 to tilt the robot R forward, there may be a situation in which the upper body of the robot R hits an obstacle in front of the robot R, and hence the robot R cannot be tilted forward as intended by the operator OP. At this time, a moment is produced about the thigh of the robot R under the external force. When this happens, the control process shown in FIG. 10 is carried out to supply the moment about the thigh under the external force to the subtractor 61. Because the moment about the thigh under the external force acts in a direction to reduce the target tilt angle of the seatback 23 determined by the seatback main control unit 43, the seatback 23 is prevented from being excessively tilted by the operator OP while the upper body of the robot R cannot be further tilted.

Since the seatback 23 is prevented from being excessively tilted by the operator OP, the leg actuators 5 of the robot R are prevented from being subject to excessive loads.

A remote control system according to a fourth embodiment of the present invention will be described below with reference to FIG. 11. The remote control system according to the fourth embodiment differs from the remote control system according to the first embodiment only with respect to a process of controlling the seatback 23 of the robot manipulator S. Those parts shown in FIG. 11 which are identical to those of the remote control system according to the first embodiment are denoted by identical reference characters, and will not be described in detail below.

According to the fourth embodiment of the present invention, if the upper body of the robot R is prevented from being further tilted by an obstacle or the like, the robot control unit 11 recognizes such a condition, and supplies a tilting action limit signal indicative of the condition through the communication unit 36 to the seatback main control unit 43 in the master control unit 35.

Figure 11:
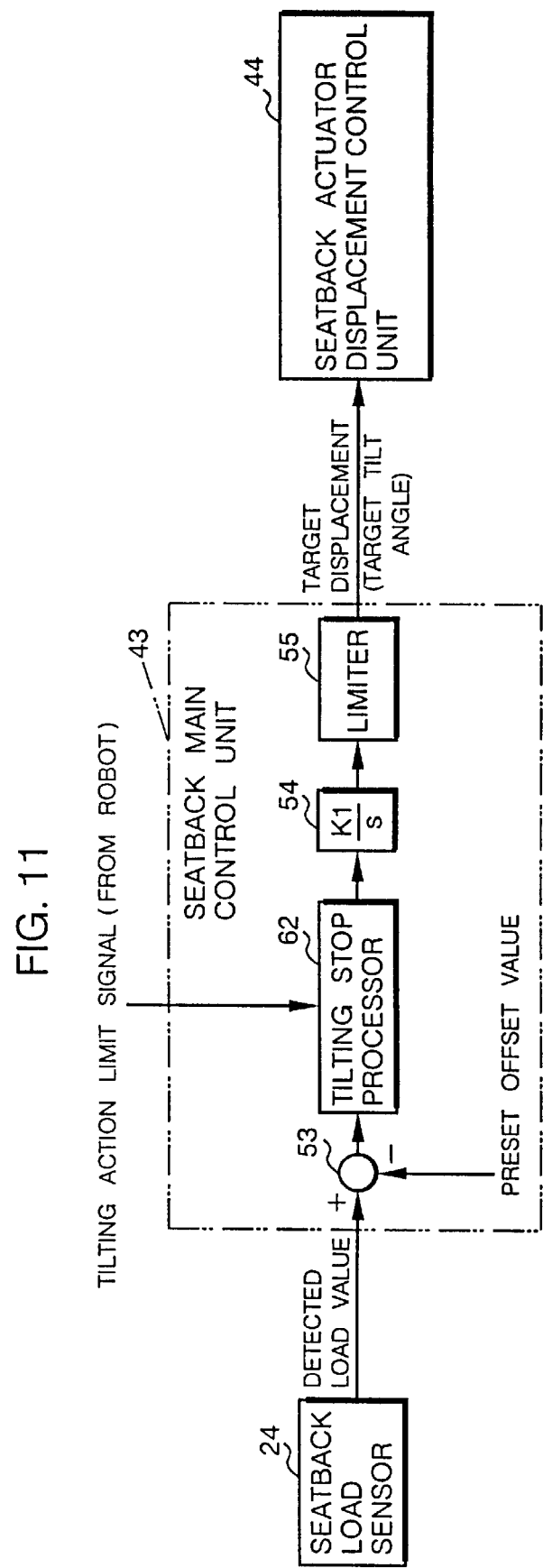
FIG. 11 is a block diagram showing the manner in which a control system section for a robot manipulator of a remote control system according to a fourth embodiment of the present invention operates.

The seatback main control unit 43 then effects a control process as shown in FIG. 11.

In the seatback main control unit 43, the output signal from a subtractor 53 which is the same as the subtractor 53 shown in FIG. 6 is supplied through a tilting stop processor 62 to the integrator 54. While being supplied with a tilting action limit signal from the robot control unit 11, the tilting stop processor 62 supplies an output signal "0" to the integrator 54 regardless of the output signal from the subtractor 53. In the absence of a tilting action limit signal from the robot control unit 11, the tilting stop processor 62 supplies the output signal from the subtractor 53 directly to the integrator 54.

Insofar as the upper body of the robot R is prevented from being further tilted by an obstacle or the like, since the target tilt angle of the seatback 23 stops changing, any tilting movement of the seatback 23 caused by the operator OP is prevented from occurring in the same manner as with the third embodiment.

Accordingly, the leg actuators 5 of the robot R are prevented from being subject to excessive loads.

In the third and fourth embodiments, the process of controlling the seatback 23 may be carried out in combination with the process of controlling the seatback 23 according to the second embodiment.

Figure 12:
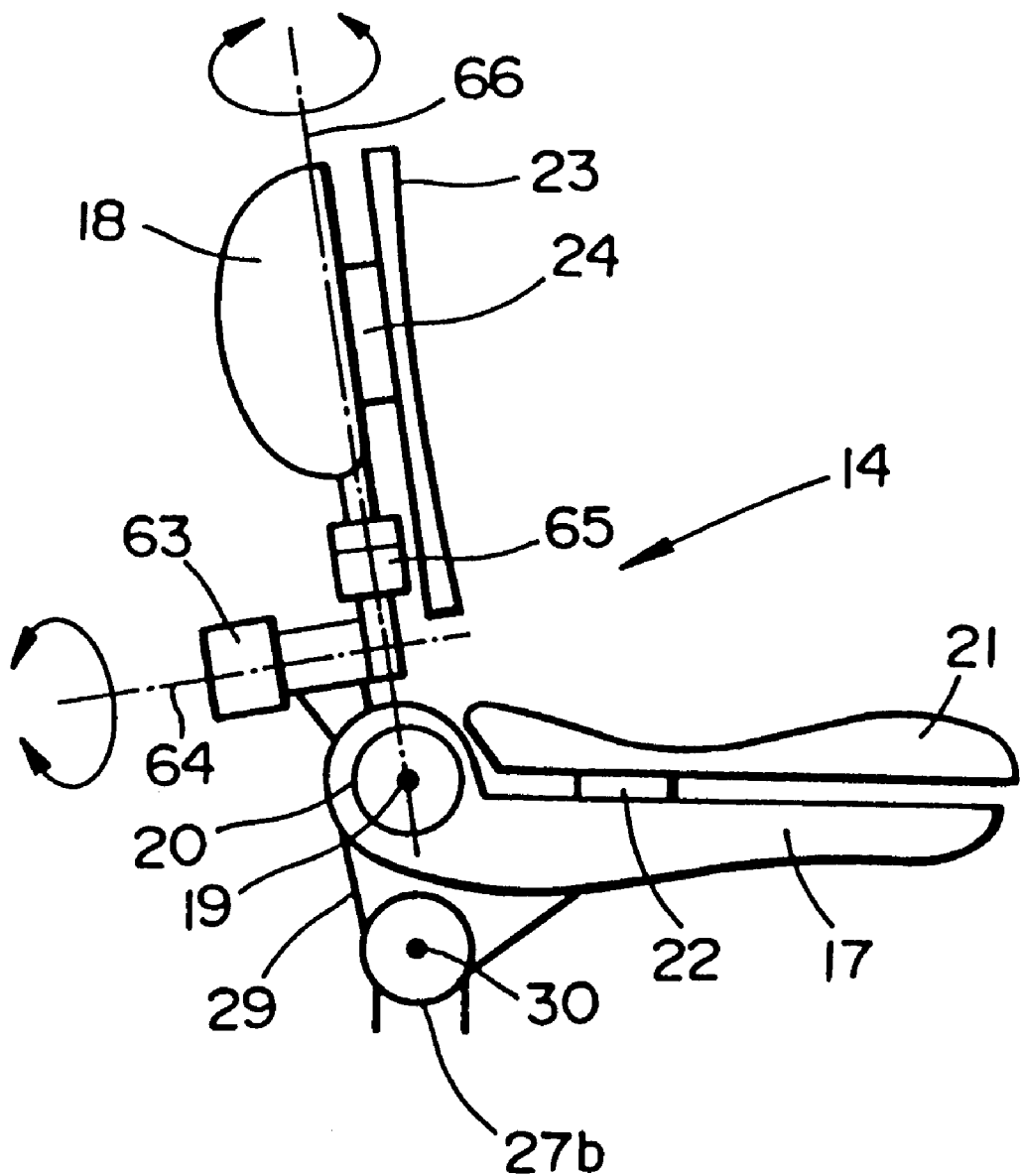
FIG. 12 is a schematic side elevational view of a seat assembly of a robot manipulator of a remote control system according to another embodiment of the present invention.

In each of the above embodiments, the robot R is tilted forward and backward when the seatback 23 is tilted forward and backward by the operator OP. FIG. 12 shows a seat assembly of a robot manipulator of a remote control system according to another embodiment of the present invention. In FIG. 12, the seatback 23 can be tilted forward and backward about the axis 19 by the actuator 20 and can also be tilted about a sagittal axis 64 by an actuator 63 and tilted or twisted about a vertical axis 66 by an actuator 65. Commands indicative of such tilting movements of the seatback 23 in those directions may be supplied to the robot R to cause the upper body of the robot R to tilted laterally and twisted about the vertical axis. The seatback load sensor 24 comprises a sensor, such as a six-axis force sensor, capable of detecting moments about the axes 19, 64, 66.

In each of the above embodiments, the seatback 23 is tilted by the actuator or actuators depending on the orientation of the upper body of the operator OP. However, the actuator or actuators may be dispensed with, and the seatback 23 may be held in a state of equilibrium by springs or the like. In such a modification, the seatback 23 is tilted only by forces applied by the operator OP, a tilt angle or tilt angles are detected by angle detectors, and the robot R is instructed to tilt its upper body based on the detected tilt angle or tilt angles.

In each of the above embodiments, the seat 21 and also the seatback 23 are tilted when the upper body orientation of the robot R becomes unstable. However, only the seat 21 may be tilted. If commands to tilt the upper body of the robot R are given to the robot R by another controller such as a joystick or the like, then only the seatback 23 may be tilted when the upper body orientation of the robot R becomes unstable.

Although certain preferred embodiments of the present invention have been shown and described in detail, it should be understood that various changes and modifications may be made therein without departing from the scope of the appended claims.

What is claimed is:

1. A remote control system for remotely controlling a legged moving robot, comprising:
a robot manipulator operable by an operator seated on a seat assembly thereof for applying an operation command to the legged moving robot, said seat assembly having a seatback or a seat which is tiltable;
control means on the legged moving robot, for controlling the legged moving robot automatically to achieve a target orientation stably depending on said operation command from said robot manipulator;
orientation detecting means for detecting an orientation of said legged moving robot; and
tilting means for tilting said seatback or said seat depending on a deviation of the orientation of said legged moving robot detected by said orientation detecting means from said target orientation.

2. A remote control system according to claim 1, wherein said tilting means comprises means for tilting said seatback or said seat by a distance depending on the magnitude of said deviation of the detected orientation from said target orientation.

3. A remote control system according to claim 1, wherein said seat is tiltable to move a front end thereof vertically, said tilting means comprising means for tilting said seat in a direction to lower said front end thereof when said deviation of the detected orientation from said target orientation lies in a direction which said legged moving robot is tilted forward, and tilting said seat in a direction to lift said front end thereof when said deviation of the detected orientation from said target orientation lies in a direction which said legged moving robot is tilted backward.

4. A remote control system according to claim 1, wherein said seat is tiltable leftward and rightward, said tilting means comprising means for tilting said seat rightward when said deviation of the detected orientation from said target orientation lies in a direction which said legged moving robot is tilted rightward, and tilting said seat leftward when said deviation of the detected orientation from said target orientation lies in a direction which said legged moving robot is tilted leftward.

5. A remote control system according to claim 1, wherein said seat is tiltable to move a front end thereof vertically and also tiltable leftward and rightward, said tilting means comprising means for tilting said seat in a direction to lower said front end thereof when said deviation of the detected orientation from said target orientation lies in a direction which said legged moving robot is tilted forward, tilting said seat in a direction to lift said front end thereof when said deviation of the detected orientation from said target orientation lies in a direction which said legged moving robot is tilted backward, tilting said seat rightward when said deviation of the detected orientation from said target orientation lies in a direction which said legged moving robot is tilted rightward, and tilting said seat leftward when said deviation of the detected orientation from said target orientation lies in a direction which said legged moving robot is tilted leftward.

6. A remote control system according to claim 1 or 3, wherein said seatback is tiltable forward and backward, said tilting means comprising means for tilting said seatback forward when said deviation of the detected orientation from said target orientation lies in a direction which said legged moving robot is tilted forward, and tilting said seatback backward when said deviation of the detected orientation from said target orientation lies in a direction which said legged moving robot is tilted backward.

7. A remote control system according to claim 1 or 4, wherein said seatback is tiltable leftward and rightward, said tilting means comprising means for tilting said seatback rightward when said deviation of the detected orientation from said target orientation lies in a direction which said legged moving robot is tilted rightward, and tilting said seatback leftward when said deviation of the detected orientation from said target orientation lies in a direction which said legged moving robot is tilted leftward.

8. A remote control system according to claim 1 or 5, wherein said seatback is tiltable forward, backward, leftward, and rightward, said tilting means comprising means for tilting said seatback forward when said deviation of the detected orientation from said target orientation lies in a direction which said legged moving robot is tilted forward, tilting said seatback backward when said deviation of the detected orientation from said target orientation lies in a direction which said legged moving robot is tilted backward, tilting said seatback rightward when said deviation of the detected orientation from said target orientation lies in a direction which said legged moving robot is tilted rightward, and tilting said seatback leftward when said deviation of the detected orientation from said target orientation lies in a direction which said legged moving robot is tilted leftward.

9. A remote control system according to any one of claims 3 through 5, wherein said seatback is tiltable in unison with an upper body of the operator, said robot manipulator having means for applying a tilting movement of said seatback as an operation command to tilt an upper body of said legged moving robot to said legged moving robot.

10. A remote control system according to 9, further comprising tilting limiting means for limiting a tilting movement of said seatback caused by an orientation change of the upper body of the operator when said seat is tilted.

11. A remote control system according to 10, wherein said tilting limiting means comprises means for correcting an amount of tilt of said seatback depending on a force applied from said operator to seat or an amount of tilt of said seat when said seat is tilted.

* * * * *